…

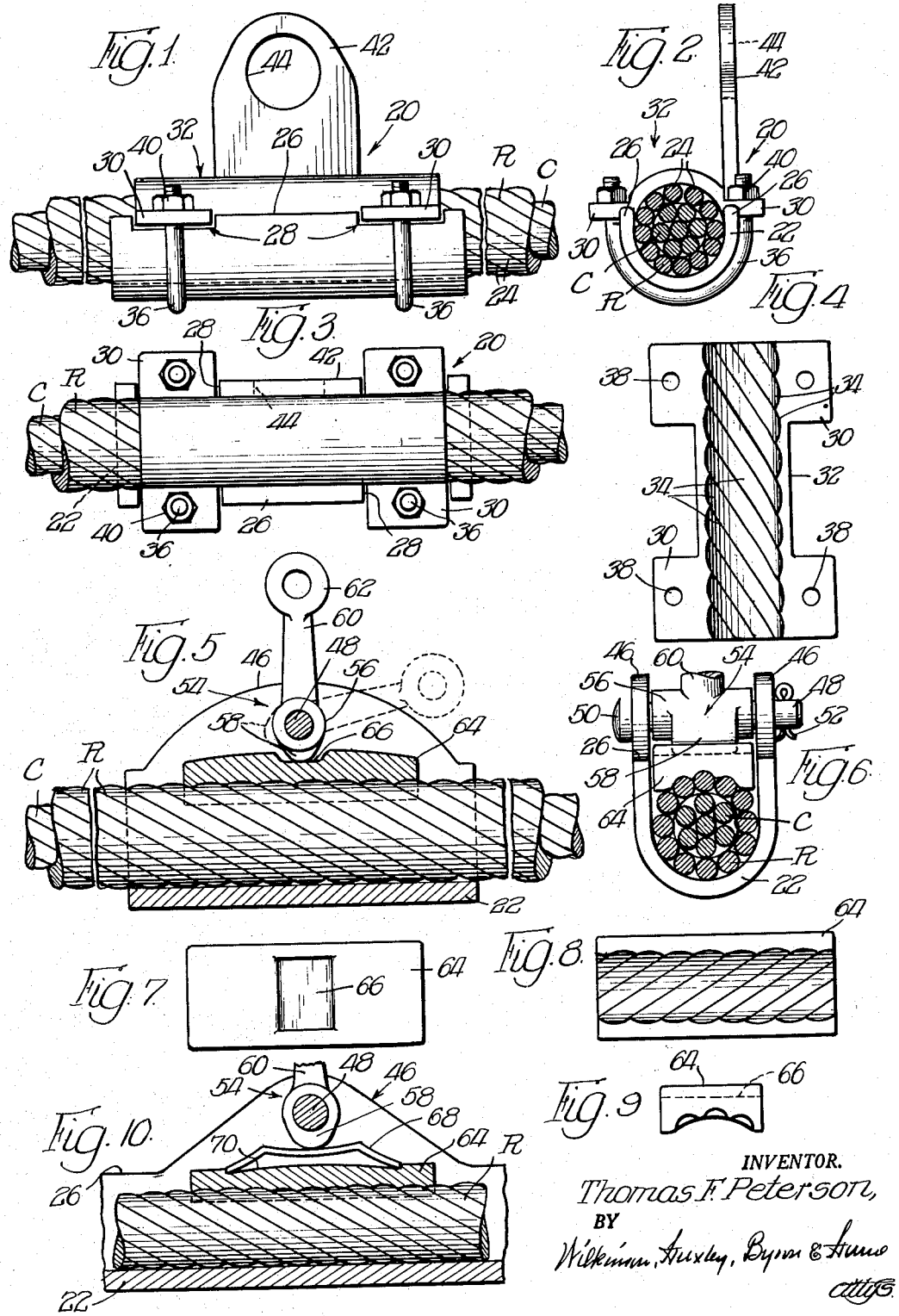

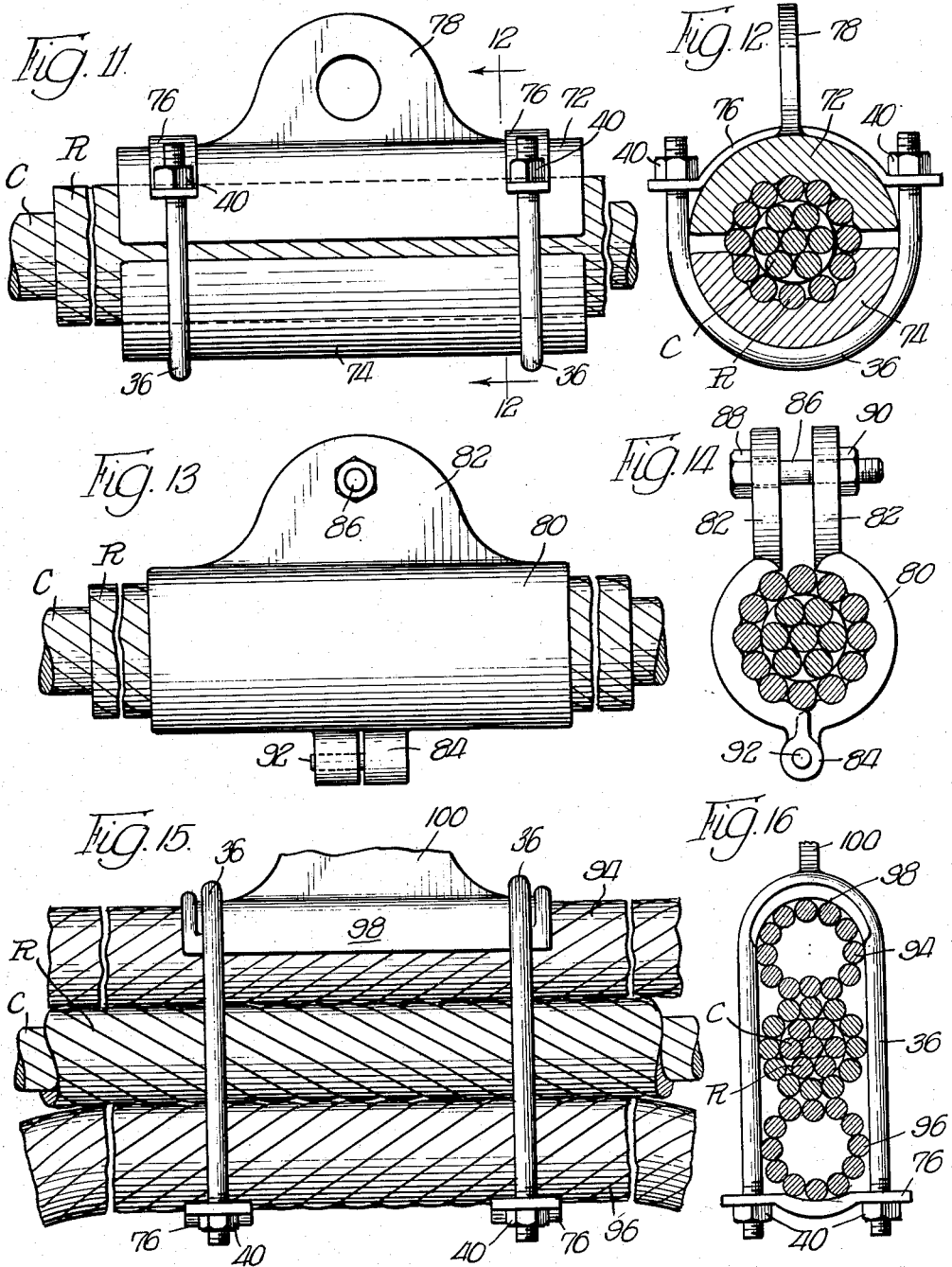

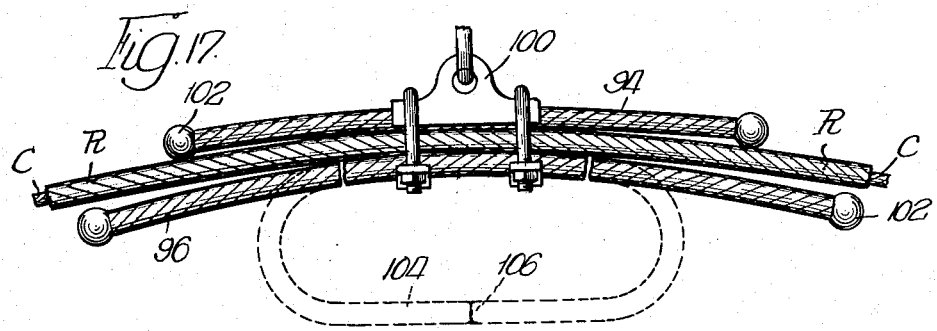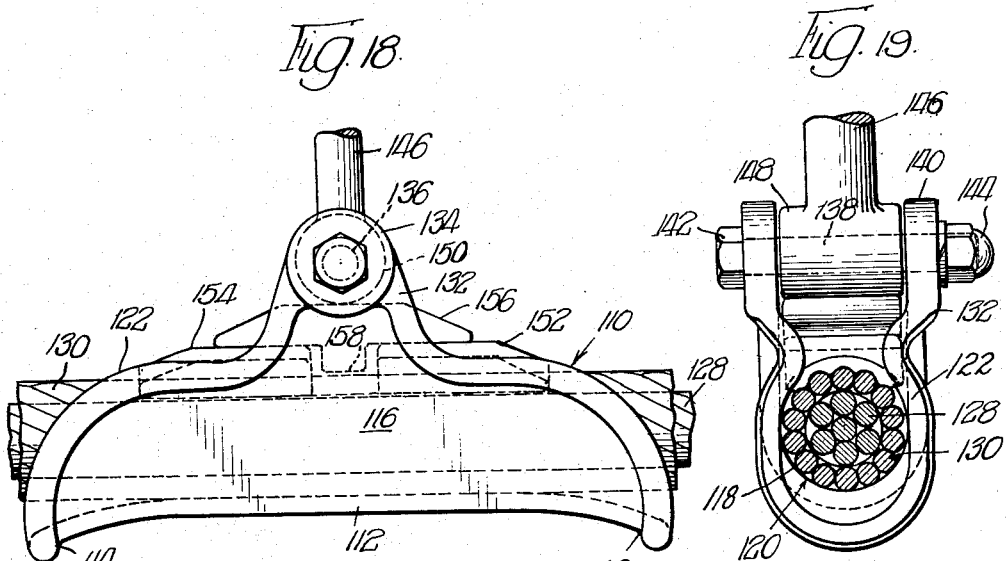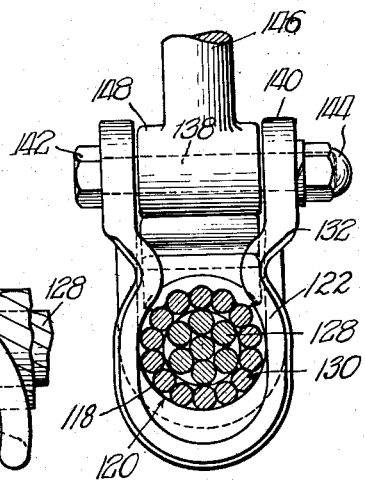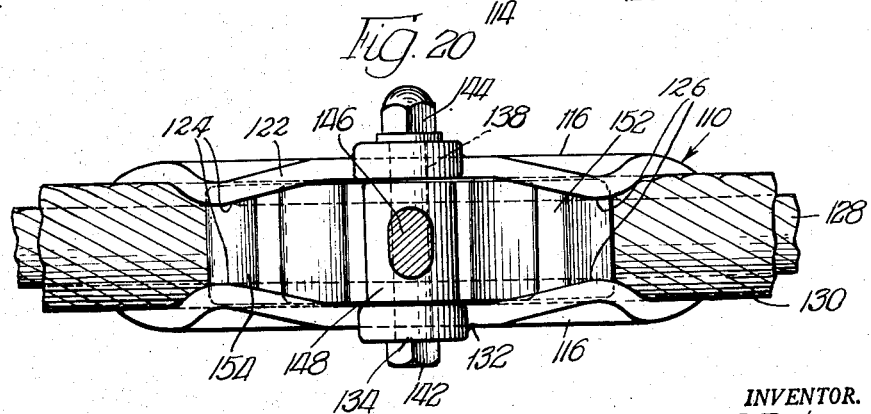

United States Patent Office 3,026,077
Patented Mar. 20, 1962

3,026,077
SUPPORT FOR ARMORED CABLES
Thomas F. Peterson, Shaker Heights, Ohio, assignor to Preformed Line Products Company, Cleveland, Ohio, a corporation of Ohio
Filed June 8, 1951, Ser. No. 230,591
4 Claims. (Cl. 248—63)

This invention is directed to stranded bodies similar, but not limited, to electric transmission lines, and especially conductors which are suspended from supports in elevated relation to the ground. It is particularly concerned with improving the means and methods now employed for hanging conductors which are reinforced with helically preformed armor rods or wires in ways which make the conductor fast against axial slippage through the hanger bracket or clamp without the imposition of excessive clamping forces which tend to overstress and crush the internal wires of the stranded conductor.

My prior Patents No. 2,275,019 and No. 2,587,521 and pending applications, Serial No. 698,312; Serial No. 2,200, now abandoned, among others, disclose methods and means for reinforcing suspended cables involving helically preformed elements. These elements, which are usually made from hard-drawn metal wires or rods, including steel, aluminum, and cupreous alloys, are preformed into open pitch helices of conforming pitch and hand which have an inside helical diameter slightly smaller than the outside diameter of the cable to which they are to be applied, and a pitch angle designed to cooperate with the pitch and lay of the stranded conductor, to the effect that such helices may be applied singly or in multiples from the side of the conductor and twisted into place thereon tightly to hug the latter in tracking relation with its strands.

Such helical reinforcements are usually applied in sufficient number, called a set, to balance each other by encompassing the conductor along diametrically opposed courses for a portion of its length at and to each side of the hanger supports for a distance of a few feet. Due to the helical character of the reinforcement, just as in the case of the stranded conductor itself, the natural curvature of the conductor, as it rises and falls in catenary loops from support to adjacent supports, is accommodated flexibly without sharp bends or abrupt changes in attitudes and conditions such as characterize the older, rigid types of supports. One principal difference is found in the fact that helically preformed reinforcements, though by nature flexible, add additional mass and strength to the associated portion of the conductor to minimize the curvature of bend, rendering a more gradual and favorable condition in this respect, and eliminating the need for long, curved, rigid saddle bearings heretofore common to such constructions. That is to say, hanger brackets of minimal dimensions and of improved cost efficiency have been made possible by the use of helically preformed reinforcements.

The diminished size of hangers has meant less area of frictional engagement with the reinforced conductor, and a reduced area along which clamping means can be applied. Those factors, taken with the fact that the preformed reinforcements, unlike their straight counterparts which are formed into place about the conductor in the field, do not have retaining clamps or lashings such as engage the hanger as thrust bearings to resist axial displacement thereof, have caused some problems in securing the conductor against slippage. The tendency has been for the linesmen charged with making the installations to tighten the U-bolts or shackles by which the cable is retained in the hanger to an immoderate degree, thus placing the enclosed parts under crushing compression realized from the great leverage of the wrenches they employ.

At first it was assumed that this practice was harmless in view of the protection afforded by the preformed reinforcements. Later it became apparent that the conductors were deteriorating under fatigue field conditions. Inspection revealed, not that the reinforcements were injured, nor even the outside strands of the conductor, but the interior strands of the latter were failing due to some inobvious concentration of stresses, and failing at internal points that made detection and repair extremely difficult. The problem then became one of securing the reinforced conductor sufficiently to prevent axial slippage, an absolutely essential provision, without imposing clamping stresses which might ultimately shorten its life. There was no way to foretell or measure how much the clamps should be tightened as a rule of procedure to guide the thousands of linesmen, themselves presenting the usual errors of the human element: diverse in strength and aptitudes, working under equally diverse conditions and circumstances, with tools and materials of widely differing mechanical and physical properties. The present invention points to a solution of these difficulties.

It has previously been proposed to engage stranded conductors with hanger elements that have been internally serrated or grooved so as to enhance the holding power of the hanger in resistance to axial slippage of the conductor. Since random serrations or rugosities in the surfaces of the hanger confronting the conductor bear upon the strands, and, under pressure, dig into the latter to form points of stress concentration which reduce fatigue life, it has been proposed to score the conductor bearings in grooves intended to conform to the strands, so as to seat the latter and hold them fast against axial slippage without damage. Such, at least, was the theory of the prior art regarding helically grooved cable hanger bearings. In practice, however, since the hangers were made independently of the conductors, usually at separate times and places, and by unrelated manufacturers, such grooving had to be made according to prevailing cable specification standards, and were, accordingly, idealized to standard dimensions of pitch, lay, and size, for later association with appropriate cables and installation in the field. It was found, however, that actual conformance, due to variables inherent in cable manufacture, was so rarely realized as to be veritably non-existent and unobtainable. Non-conformance, or approximate conformance, still was subject to the objections of the randomly-oriented serrations, previously noted, and so, generally, these practices have never enjoyed much favor nor extensive use.

In the present invention, helically grooved hanger bearings, or bearings roughened after a pattern of preferred orientation of serrations, are made effective in the axial retention of conductors, while avoiding the objection of the prior art just discussed, by the adaption and utilization of helically preformed armor wires or rods in conjunction therewith. Such armor rods are individually preformed under controlled conditions to an exact helical form as to pitch and dimension for the size of rod or wire selected. Hanger bearings can be accurately helically grooved to accommodate such preformed armor rods without consequential variation therebetween, and are thus logically combined therewith to recall the benefits of such practice without incurring its disadvantages.

It is, accordingly, one of the principal objects of this invention positively to support and secure conductors against axial slippage without excessive clamping stresses or other conditions that might impair their physical properties and useful life, in a uniform, controlled manner, which is capable of universal and repeated application without sensible variation, irrespective of the human element, and the other variables of tools, conditions, materials and circumstance.

It is a related object to provide a simplified means and method for suspending cables that are as economical as those employed in comparable present and past techniques, and which require no special knowledge or tools on the part of the workmen.

Other objects and advantages may be derived from the following specification when considered in conjunction with the accompanying drawings, in which:

FIGURE 1 is a side elevational view of a cable hanger and clamp embodying the principles of this invention, in which a reinforced cable is fragmentarily shown;

FIGURE 2 is an end view of the assembly shown in FIGURE 1;

FIGURE 3 is a plan view of the assembly shown in FIGURES 2 and 3;

FIGURE 4 is a bottom plan view of the closure element which appears in the preceding figures, showing the helical grooving or serrations which register with the cable or its reinforcement;

FIGURE 5 is a modified type of cable hanger shown in side midsectional elevation;

FIGURE 6 is an end view of the assembly shown in FIGURE 5;

FIGURES 7, 8 and 9 are top and bottom plan views and end view, respectively, of the closure element or slipper shown in FIGURES 5 and 6;

FIGURE 10 is a modification of the device shown in FIGURE 5, and of comparable viewpoint;

FIGURE 11 is still another modified form of the invention shown in side elevational view, while FIGURE 12 is a sectional view taken along line 12—12 of FIGURE 11;

FIGURES 13 and 14 are side and end elevational views, respectively, of a further modification of the invention;

FIGURES 15 and 16 correspond, respectively, to FIGURES 13 and 14, showing one form of the invention employing tubes of helically preformed reinforcements of reverse hand, but same pitch, as that surrounding the conductor in "cogging" relation with the latter;

FIGURE 17 is a reduced side elevational view showing corona prevention treatments for the inventions of FIGURES 15 and 16; and FIGURES 18, 19 and 20 are elevational, end and plan views, respectively, of a further modified version of this invention.

In the drawings, wherein like characters of reference refer to similar parts, FIGURES 1 to 3 inclusive, show a more or less conventional type of hanger bracket 20, consisting of a hollow, semi-cylindrical cable bearing or saddle portion 22 adapted to conform more or less snugly to the reinforcement R of a cable C, the former of which is comprised of a plurality of preformed helical armor elements 24 which enclose the strands of the cable in tightly gripping relation. This description of the reinforcement R and cable C will suffice for all of the remaining figures. It should be noted, however, that less than the number of armor rods shown may be used down to two. In such cases, a symmetrical disposition around the conductor is preferred to balance weight and stresses, and to equalize distorting influences imparted by each armor rod.

The cable bearing portion 22 has upper horizontal edges 26 which are relieved in four places to provide opposed pairs of open recesses 28 for the accommodation of lugs 30 on a cap or closure member 32 shown in these views, as well as in FIGURE 4. The member 32 is generally of concavo-convex cylindrical form, having grooves 34 on its inner concave face which generally conform to and register with the courses 24 of the reinforcement R in complementary relationship therewith. A pair of U-bolts or shackles 36 pass around the cable bearing portion 22 and pass at their upper ends, respectively, through bolt-holes 38 provided in the pairs of opposed lugs 30 of the closure member, and seat the latter firmly in the recesses 28 by means of nuts 40. Over-tightening of the shackles is precluded by the engagement of the lugs 30 upon the bottoms of the recesses 28, while the closing movement, thus delimited, is sufficient to draw the helical grooves 34 of the cap into gentle, yet firm, engagement with the elements of the reinforcement R.

From this arrangement it is apparent that the reinforcement R grips the cable C so as to preclude any axial slippage therebetween. The reinforcement R is confined between the closure member 32 and the bottom of the cable bearing member 22, and is geared to the closure member by virtue of its grooves 34 which project between adjacent courses of the reinforcement firmly, but without crushing pressure. Forces that would tend to move the cable axially, are thus transmitted harmlessly to the sides of the recesses 28 through the closure member 32 and its lugs 30, to the hanger body itself. At one side, the upper edge 26 of the bearing member 22 is projected upwardly between the recesses 28 to constitute a hanger-engaging tongue 42 which is provided with an opening 44 for receiving conventional insulator fastenings (not shown). Through these latter instrumentalities, any axial thrust of the cable assembly is transmitted and absorbed by the supports.

In FIGURES 5 and 6 another means for achieving this end is depicted. Here the cable C and reinforcement R repose in the hanger bearing 22 as previously described. In this instance, the upper edges 26 of the hanger bearings are both provided with upstanding walls 46 having opposite aligned openings for the accommodation of a pin 48, which is adapted to pass therethrough (FIG. 6) and be retained therein by a head 50 and a cotter pin 52. The pin 48 is adapted to impale in pivoted relation a cam element 54, which has a cylindrical body portion 56 through which the pin passes, and which is in free-turning relation between the upstanding walls 46. A cam projection 58 extends radially from one side of the body portion 56, while a suspending arm 60 projects diametrically opposite to the projection 58 from the latter. An eye 62, or other insulator engaging means, is affixed to the outer end of the arm 60.

A closure member or keeper 64, made like the element 32 shown in FIGURE 4, but without the lugs 30, having helical grooves or serrations 34 of the construction and for the purposes previously set forth, is adapted for insertion between the walls 46 of the hanger body, and may be made of a height or thickness either to be slipped between the reinforced cable and the cam element 54, when the latter is turned aside, as shown in dotted lines, FIGURE 5, after the said element and pin are already in place, or may be of a size that requires the cam element and pin to be applied after it is in place, so as to be confined thereby. In either case, the keeper 64, on its outer surface, is provided with a recess 66 into which the projection 58 of the cam element is adapted to be swung or placed. Clearances are such that axial movement imparted to the keeper by the cable is arrested by the projection 58 when it is disposed within the recess 66, and a positive lock, enhanced by the weight of the assembly hanging upon the arm 60, is thus realized.

The construction of FIGURE 10 is similar to that just described, except that the clearance between the cam element 54 and the reinforced cable is sufficiently great to allow for the interposition of a specially shaped leaf spring 68, which is accommodated in a modified recess 70 in the keeper 64, all as shown in FIGURE 10. This arrangement provides a resilient cushion between the positive cam action of the pivoted cam element 54 and the keeper so as to preclude over-stressing the reinforced conductor, and to allow for some variation in the sizes of the latter that can be accommodated in this type of hanger.

In the form of the invention shown in FIGURES 11 and 12, two half-bearing hanger sections 72 and 74 are provided, each with an helically grooved internal surface for engaging in complementary fashion the helical courses of the reinforced cable. Here, again, U-bolts or shackles 36 are provided to draw the sections together by means of nuts 40 which may engage lugs (not shown) provided on the half-section 72 for this purpose, or yokes 76 apertured and positioned in the usual way to accomplish this purpose. The sections may be constructed to abut along their confronting edges to limit the degree of clamping made possible thereby, or they may, as shown, be left more open, as in the accommodation of reinforced cables of larger diameters. In the latter case, only moderate clamping pressures are required to obtain complete axial retention of the cable by virtue of the internal grooving provided inside the sections. In this embodiment, a single central hanger fin 78 is provided to engage the insulator brackets.

In FIGURES 13 and 14, there is a further modification of the half-section principle last described. In this case, the plane of cleavage between the two sections is relatively in the vertical. Each half-section 80 has internally grooved surfaces for reasons previously explained, and is provided with an upstanding fin 82 and a hinge element 84. The fins are oppositely apertured to receive a pintle or bolt 86 retained by a head 88 and a nut 90, which is set up on the threaded shank to position the half-sections at various positions approaching complete closing, and may effect the latter completely where the size of reinforced cable permits. The insulator fastenings are accommodated by the bolt 86 to suspend the assembly. The hinge elements 84 are connected in pivotal relation by a pivot pin 92 which may be permanently associated with one of the elements, or may be slipped into the latter when their bores are aligned. Clamping pressures in this embodiment may be controlled by a spacer sleeve (not shown) disposed around the shank of the bolt 86 between fins 82, or by any other suitable spacer elements, such as shims, disposed between them. In the absence of adequate spacing means, only moderate clamping pressures need be applied firmly to hold the cable against slipping.

In FIGURES 15, 16 and 17, a modification of the grooving principle is had by employing in conjunction with the reinforced cable, a pair of reinforcing tubes (in this case empty) composed of reinforcing elements 24 the same as comprise the reinforcements R, but of the opposite hand. By being comparable in size, number and pitch, but opposite in hand, these hollow reinforcing tubes 94 and 96 "cog" with the cable reinforcements much in the manner, and for the same reasons, as helical gears "cog" with one another. U-bolts or shackles 36, having their parallel legs spaced at a distance substantially equal to the overall diameter of the reinforced cable, co-operate with yokes 76 and nuts 40 to confine the assembly as shown in these figures. A shackle saddle 98, having a hanger fin 100, completes the assembly. There is thus afforded a large measure of relief from excessive compression by virtue of the resilience of the hollow reinforcing tubes 94 and 96, while at the same time a positive locking of the cable against longitudinal movement is realized.

To prevent corona losses at the cut edges of the hollow tubes 94 and 96, they may each be extended and capped to constitute arcing-horns 102, or each may be lengthened or doubled back upon itself to form a closed loop 104, in which case a small section of a conductor could be used as a mandrel 106 to join the free ends of each tube together by closing the component helical elements thereupon in the usual manner.

In the modification shown in FIGURES 18, 19 and 20, a cable hanger bracket 110 is provided with a cable bearing portion 112 that is curved downwardly as at 114 at each of its ends. The cable bearing portion is enclosed by two upstanding side portions 116 of corresponding size and shape, which are faired into the cable bearing portion in a gradual curvature 118 (FIG. 19) so as to embrace an armored cable 120. The upper edges of the side walls 116 are rounded into a lip portion 122, which, as shown in FIGURE 20, curves inwardly to form two constricted portions 124 and 126 adjacent to the opposite ends of the hanger bracket. The clearance between the constricted portions is slightly greater than the diameter of the unarmored conductor 128 to be accommodated therein, so that the bracket may be assembled over the cable at an unarmored portion of the latter and then slid axially into engagement with the armored portion 130 thereof. The curved inner surface of the hanger bracket is but slightly larger than the overall diameter of the armoring 130 when in position upon the cable 128, and the latter is too large to pass through the constricted portions.

The bracket intermediate its ends is provided with upstanding extensions 132 of each of the side walls 116, which extensions at their upper extremity terminate in bearing portions 134, in which openings 136 are disposed in axial alignment to each other for the accommodation of a bolt or pin 138. The edges 140 of the extensions are rounded and faired into the rounded lip portions 122 of the adjacent walls of the bracket, and thus are devoid of sharp edges which tend to cause corona losses.

Disposed between the upstanding extensions 132 of the bracket is a hanger arm 146 which has a journal 148 at its lower extremity for the accommodation of the bolt 138 in pivotal relation to the latter.

The mass of the journal portion 148 is slightly eccentric to the axis of the bolt 138, so that when the arm 146 is in the vertical position as shown in these figures, an eccentric cam 150 having greater masses projected radially in a horizontal direction than radially in a vertical direction are provided 180 degrees apart at each side of the bolt. The vertical extent of the journal portion 148 being less than the horizontal extent of such journal portion when the arm is positioned as shown, there is provided beneath the journal portion, clearance for the accommodation of a keeper assembly comprising a right-hand keeper element 152 and a left-hand keeper element 154, which are separated centrally of the assembly, and which lie on top of the armored conductor within the confines of the constricted portions 124 and 126 thereof. The right-hand keeper wedges in the bracket upon incipient rightward movement of the cable in an axial direction to arrest such movement before it really develops, and the left-hand keeper acts likewise in the opposite direction.

A positioning and spacing element 156, having a centrally dependent lug 158, is placed in overlying relation to the keepers 152 and 154, so that the lug 158 projects downwardly between the proximate ends of the latter to maintain them in spaced relation within the confines of the restricted portions.

This assembly is completed before the arm 146 and its attaching bolt 138 are installed. After the latter are placed, the cam 150 is disposed just above the retaining element 156 and may or may not have contact therewith in this position.

The outer end of the arm 146 is provided with an eye or hook, or other suitable fastening means, to engage the conventional insulator hanger assembly. The relationship is such that unbalanced axial forces acting on the cable tend to move the bracket 110 to the right or to the left, thus causing the arm 146 to pivot around the bolt 138 and the cam 150 of the journal portion associated therewith to oscillate so that its portions 150 of greater radius are caused to bear upon the retaining element 156, irrespective of the direction in which the arm 146 is turned. The retaining element 156 in turn bears upon the keepers 152 and 154 to increase the compressive force upon the armored conductor in the hanger bracket. Since the opposite ends of the keepers are confined by the constricted portions 124 and 126 of the bracket, as already mentioned, they tend to wedge more securely into engagement therewith to lock the cable against any tendency to move. This action is augmented by the compressive forces derived from the retaining element 156, securely to hold the cable against axial movement relative to the bracket. When the axial load again comes into balance, the hanger arm 146 is returned to the vertical and the armored conductor and associated parts are relieved of the compressive stress. In this manner, the forces resisting axial displacement of the cable are in direct proportion to the unbalanced forces tending to effect axial displacement thereof, and are non-existent when the latter are non-existent. This gives an ideal condition of normally stress-free cable, while, at the same time, affording that degree of force resistant to axial displacement as might be needed when the occasion arises.

As already discussed in the foregoing embodiments, it is preferred that the internal faces of the keepers 152 and 154, which are in engagement with the armoring on the conductor, be provided with the serrations or ridges that are complementary to and register with the courses of the armoring, as appears in FIGURE 19. There is thus provided a positive means for holding cables or conductors suspended in a bracket of this kind without destructive clamping forces.

It will be obvious from the foregoing, that the considerations to be served in devices of this kind have been fully provided for as were set forth in the fore part of this specification. Obvious refinements and adaptations which might depart from the precise embodiments shown and described herein are, of course, possible and expected. Thus, the grooving applied to the closure and slipper elements in some of the figures might be applied to the cable bearing elements as well, and either included or eliminated from the closure and slipper elements accordingly. Similarly, the grooving need not be strictly helical, but may take the form of serrations, notches, or protuberances of relatively small extent along their major course-conforming dimension, and even disposed in random orientation so long as points of high bearing stress concentration are avoided. Wires brazed into proper position, preferably of soft consistency, are one feasible means for obtaining the desired holding properties without damaging the reinforcements on the cable. Soft metal liners, either molded in advance to conform, or forced into conformance by assembly pressures, are contemplated, and to the same extent plastic liners capable of being bonded or secured to the cable bearing elements, or their closures or slippers, or both, can be employed. Abrasive grit, with or without a fluent vehicle, can be used, to augment the holding power of the hanger without requiring excessive clamping pressures. Therefore, these and many similar modifications are possible within the scope of this invention, as is apprehended in and by the appended claims, without being a departure therefrom.

I claim:

1. Suspension means for electrical conductors and the like comprising a cable-bearing saddle, side walls on said saddle, each wall having an extension adjacent its middle extending upwardly in opposed relation to the extension on the other wall, said walls and extensions being spaced apart a distance sufficient to admit a cable-like body, said side walls at each side of said extensions being formed into tapered constricted portions, a pair of longitudinally movable keeper elements adapted to wedge, respectively, in said constricted portions, and a retaining device having a projection extending between said keeper elements overlying the latter between said extensions, and means for holding said retaining device in position.

2. Claim 1, in which said means comprises, a lever arm having a journal at one of its ends, a pin in said journal, said pin being connected at its opposite ends to said extensions thereby pivotally to fasten said lever arm thereto in confining relation to said retaining device.

3. Claim 2, in which said lever arm has cam portions at each side of said journal, whereby oscillation of the lever arm about said pin exerts compressive force upon said retaining device when said lever is other than normal to said cable-bearing saddle.

4. Claim 3, in which said lever arm at its end opposite said journal provides means for attachment to external suspending devices, said keepers having strand-conforming indentations formed upon their faces confronting the interior of said saddle.

References Cited in the file of this patent

UNITED STATES PATENTS

| Re. 20,074 | Stahl | Aug. 18, 1936 |
| 1,624,399 | Ellis | Apr. 12, 1927 |
| 1,844,957 | Hofmann | Feb. 16, 1932 |
| 1,864,802 | Clark | June 28, 1932 |
| 1,873,798 | Varney | Aug. 23, 1932 |
| 1,935,573 | Moore | Nov. 13, 1933 |
| 1,936,323 | Bowen | Nov. 21, 1933 |
| 1,966,414 | Main | July 10, 1934 |
| 1,968,888 | Hillebrand | Aug. 7, 1934 |
| 2,275,019 | Peterson | Mar. 3, 1942 |
| 2,587,521 | Peterson | Feb. 26, 1952 |

FOREIGN PATENTS

| 728,965 | Germany | Dec. 7, 1942 |